US012683935B2

(12) United States Patent
Verma et al.

(10) Patent No.: US 12,683,935 B2
(45) Date of Patent: *Jul. 14, 2026

(54) QUANTUM READY INTELLIGENT SECURITY GATEWAY

(71) Applicant: Palo Alto Networks, Inc., Santa Clara, CA (US)

(72) Inventors: Sachin Verma, Danville, CA (US); Leonid Burakovsky, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/375,420

(22) Filed: Sep. 29, 2023

(65) Prior Publication Data

US 2025/0112897 A1 Apr. 3, 2025

(51) Int. Cl.
*H04L 9/40* (2022.01)

(52) U.S. Cl.
CPC ............ *H04L 63/029* (2013.01); *H04L 63/20* (2013.01)

(58) Field of Classification Search
CPC ............................. H04L 63/029; H04L 63/20
See application file for complete search history.

(56) References Cited

U.S. PATENT DOCUMENTS 9,537,953 B1 * 1/2017 Dadashikelayeh ..... H04L 63/20
10,834,136 B2 * 11/2020 Verma ................... H04L 63/029

11,019,077 B2 * 5/2021 Verma ................... H04L 63/205
2017/0357539 A1 * 12/2017 Dadashikelayeh ... G06F 9/5044
2021/0067560 A1 3/2021 Verma
2022/0353240 A1 * 11/2022 McDowall .......... H04L 63/0227
2023/0014894 A1 * 1/2023 M M ..................... H04L 9/0852

FOREIGN PATENT DOCUMENTS

CN 106161015 11/2016

OTHER PUBLICATIONS

FORTINET (Securely Use Your Radio Access Network (RAN), white paper, 8 pages, Apr. 12, 2023) (Year: 2023).*
ETSI (3GPP TS 29.571 version 17.6.0 Release 17, Jul. 2022, 189 pages) (Year: 2022).*

(Continued)

*Primary Examiner* — Oleg Korsak
(74) *Attorney, Agent, or Firm* — Van Pelt, Yi & James LLP

(57) ABSTRACT

Techniques for applying a quantum ready intelligent security gateway are disclosed. In some embodiments, a system/process/computer program product for applying a quantum ready intelligent security gateway (e.g., a quantum ready intelligent security gateway that supports quantum key distribution (QKD) and/or post-quantum cryptography (PQC) for providing a secure tunnel to the mobile network) includes monitoring network traffic on a mobile network at a security gateway to identify a new session; determining meta information associated with the new session by extracting the meta information from the network traffic via one or more interfaces; and enforcing a security policy on the new session at the security gateway based on the meta information to apply context-based security in the mobile network.

20 Claims, 15 Drawing Sheets

Service Provider Deployment 1 - Security Gateway (SEG) in 5G + 4G

Service Provider Deployment 2 - Security Gateway (SEG) in 5G + 4G

(56)     References Cited

OTHER PUBLICATIONS

3GPP, 3GPP TS 23.501 V17.5.0 (Jun. 2022), Technical Specification, 3rd Generation Partnership Project; Technical Specification Group Services and System Aspects; System Architecture for the 5G System (5GS); Stage 2 (Release 17), pp. 1-568.

3GPP, 3GPP TS 23.003 V16.9.0 (Mar. 2022), Technical Specification, 3rd Generation Partnership Project; Technical Specification Group Core Network and Terminals; Numbering, addressing and identification; (Release 16), pp. 1-143.

Author Unknown, Comments Requested on Three Draft FIPS for Post-Quantum Cryptography, https://csrc.nist.gov/news/2023/three-draft-fips-for-post-quantum-cryptography, Aug. 24, 2023, pp. 1-3.

Author Unknown, Module-Lattice-Based Digital Signature Standard, FIPS 204, Aug. 24, 2023, U.S. Department of Commerce.

Author Unknown, Module-Lattice-based Key-Encapsulation Mechanism Standard, FIPS 203, Aug. 24, 2023, U. S. Department of Commerce.

Author Unknown, Post-Quantum Cryptography PQC, https://csrc.nist.gov/Projects/post-quantum-cryptography, downloaded Sep. 15, 2023, pp. 1-4.

Author Unknown, Stateless Hash-Based Digital Signature Standard, FIPS 205, Aug. 24, 2023, U.S. Department of Commerce.

NSA, Quantum Key Distribution (QKD) and Quantum Cryptography (QC), https://www.nsa.gov/Cybersecurity/Quantum-Key-Distribution-QKD-and-Quantum-Cryptography-QC/, downloaded Sep. 15, 2023, pp. 1-5.

Mehic et al., Quantum Cryptography in 5G Networks, IEEE Communication Surveys & Tutorials, vol. 26, No. 1, First Quarter 2024, pp. 302-346.

* cited by examiner

Service Provider Deployment 1 - Security Gateway (SEG) in 5G + 4G

Service Provider Deployment 2 - Security Gateway (SEG) in 5G + 4G

Service Provider Deployment 4 - Security Gateway (SEG) in 5G

Service Provider Deployment 6 - Security Gateway (SEG) in 5G

Service Provider Deployment 7 - Security Gateway (SEG) in 4G/ LTE

Service Provider Deployment 8 - Security Gateway (SEG) in 4G/ LTE

Service Provider Deployment 9 - Security Gateway (SEG) in 4G/LTE

Enterprise Deployment 1 - Security Gateway (SEG) in Private 5G with MEC

Enterprise Deployment 2 - Security Gateway (SEG) in Private 5G with only RAN on-prem

500

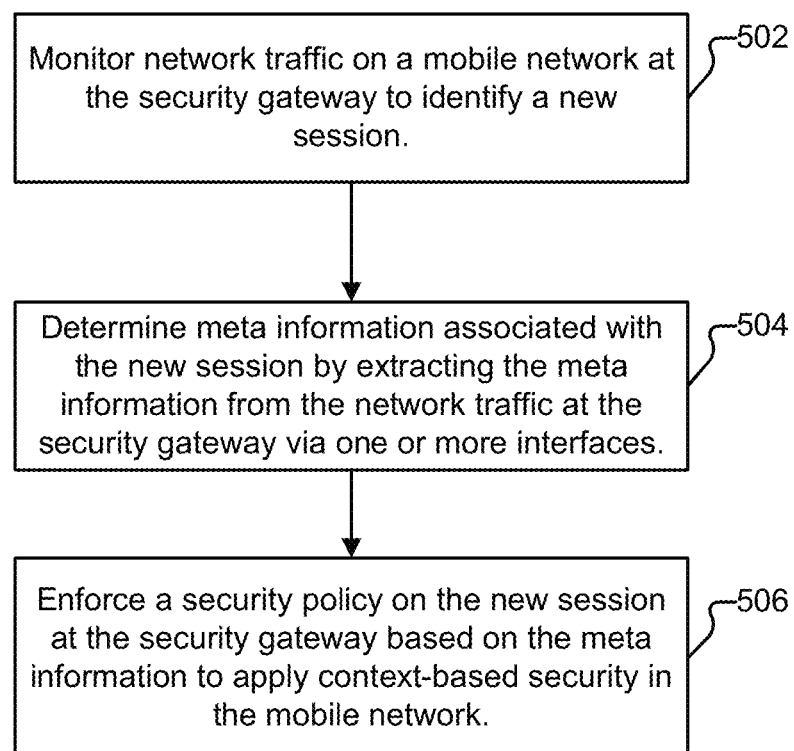

Monitor network traffic on a mobile network at the security gateway to identify a new session.

502

Determine meta information associated with the new session by extracting the meta information from the network traffic at the security gateway via one or more interfaces.

504

Enforce a security policy on the new session at the security gateway based on the meta information to apply context-based security in the mobile network.

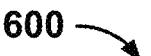

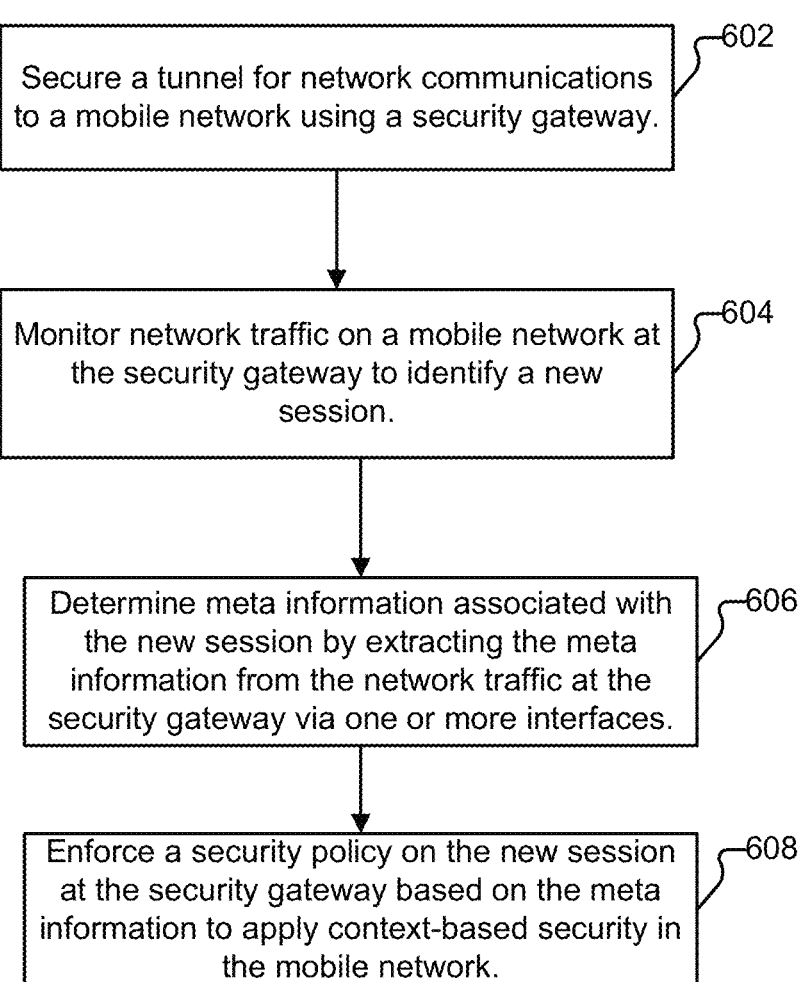

600

602

Secure a tunnel for network communications to a mobile network using a security gateway.

604

Monitor network traffic on a mobile network at the security gateway to identify a new session.

606

Determine meta information associated with the new session by extracting the meta information from the network traffic at the security gateway via one or more interfaces.

608

Enforce a security policy on the new session at the security gateway based on the meta information to apply context-based security in the mobile network.

FIG. 6

QUANTUM READY INTELLIGENT SECURITY GATEWAY

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 5 is a flow diagram of a process for a quantum ready intelligent security gateway in accordance with some embodiments.

FIG. 6 is another flow diagram of a process for a quantum ready intelligent security gateway in accordance with some embodiments.

DETAILED DESCRIPTION

Figure 1A:
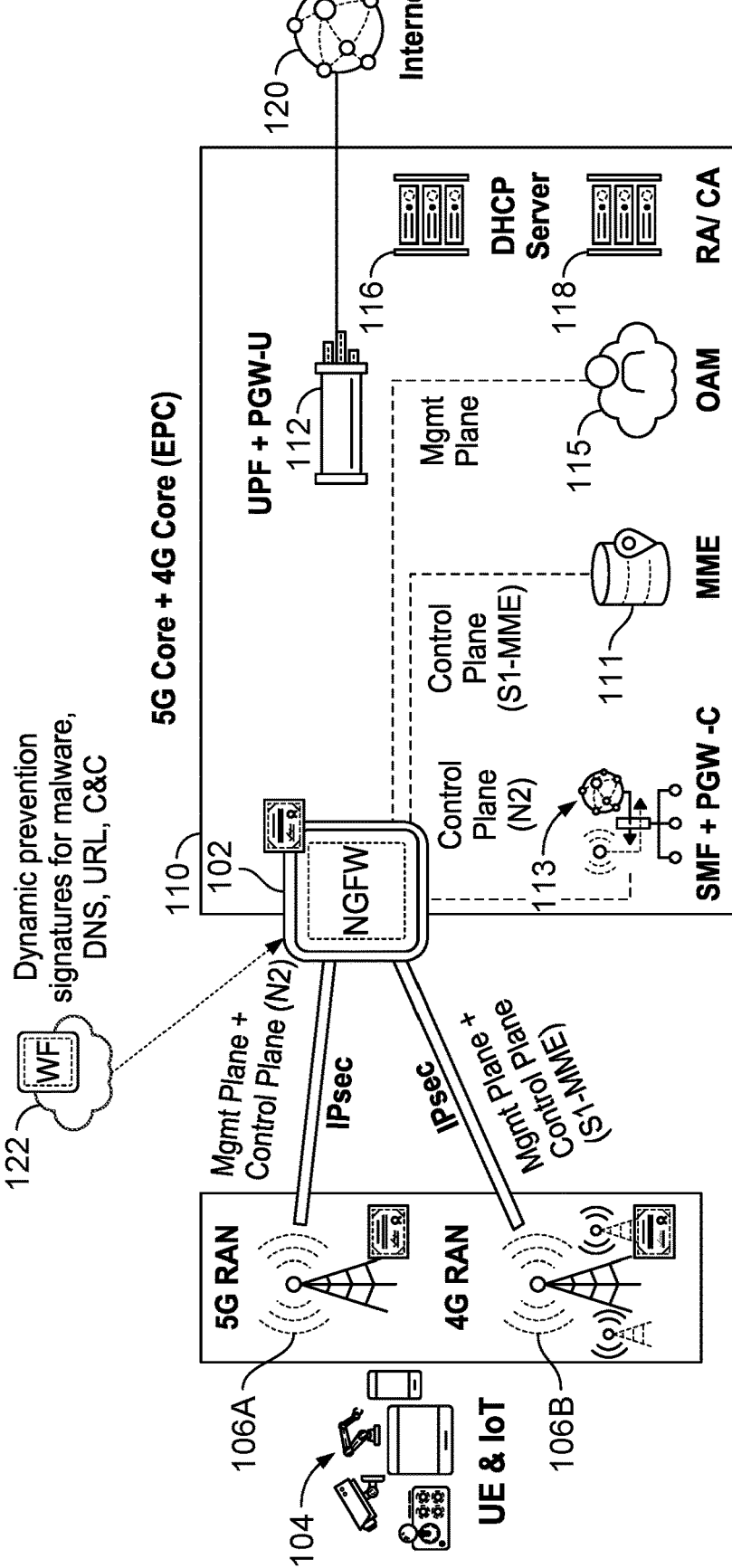
FIG. 1A is a block diagram of a first example service deployment architecture of a 5G and 4G mobile network with a quantum ready intelligent security gateway in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QOS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Applying a Quantum Ready Intelligent Security Gateway Technical and security challenges with service provider networks exist for devices in mobile networks (e.g., 4G/LTE, 5G, and later mobile networks).

Specifically, the 3rd Generation Partnership Project (3GPP) recommends a Security Gateway (SEG) to provide an Internet Protocol Security (IPsec) tunnel to secure backhaul traffic between the radio access and core network in mobile network environments (e.g., 4G/LTE, 5G, and later mobile networks).

However, existing SEGs generally cannot detect and prevent threats and malicious communications over the mobile network. Also, existing SEGs generally do not offer vulnerability protection, antivirus, anti-spyware, cloud-based security integration, DNS Security for early detection, and/or response to threats from User Equipment devices (UEs) before allowing network traffic to pass through the mobile network to the Internet perimeter (e.g., via the N3, N4 interface in 5G and via the S1-U and/or S11 interface in 4G/LTE). In addition, existing SEGs generally do not provide subscriber-ID/International Mobile Subscriber Identity (IMSI), equipment-ID/International Mobile Equipment Identity (IMEI), Network Slice ID/Single Network Slice Selection Assistance Information (S-NSSAI), IP to mobile subscriber traffic mappings inside a GTP-U tunnel, etc.

Moreover, the 3GPP has not yet introduced quantum ready algorithms for mobile networks, including for SEGs in mobile network environments. Specifically, the current 3GPP specifications include IETF protocols including, for example, TLS, DTLS, EAP-TLS, and X.509.

As such, what are needed are new and improved security techniques for devices communicating on such service provider network environments (e.g., mobile networks, including various 4G/LTE, 5G, and later mobile networks).

Specifically, what are needed are new and improved solutions for monitoring such network traffic and applying a quantum ready intelligent security gateway for mobile network environments, such as for devices (e.g., UEs) communicating over service provider networks (e.g., including for applying context-based and/or enhanced security in mobile networks based on subscriber-ID/International Mobile Subscriber Identity (IMSI), equipment-ID/International Mobile Equipment Identity (IMEI), Network Slice ID/Single Network Slice Selection Assistance Information (S-NSSAI), IP to mobile subscriber traffic mappings inside a GTP-U tunnel, and/or other context-based information to facilitate enhanced security in such mobile network environments).

Accordingly, the disclosed techniques facilitate a system/process/computer program product for a quantum ready intelligent security gateway as will now be further described below.

In an example implementation, a quantum ready intelligent security gateway is disclosed that facilitates one or more of the following:

(1) a traditional SEG as specified by 3GPP supporting IPsec security protocols and packeting filtering;

(2) vulnerability protection/Intrusion Prevention System (IPS), antivirus, anti-spyware, cloud security integration/support (e.g., for cloud-based security analysis), DNS security, and/or Denial of Service (DOS) protection;

(3) subscriber-ID/IMSI, equipment-ID/IMEI, Network Slice ID/Single Network Slice Selection Assistance Information (S-NSSAI), and/or other mobile context level visibility and enforcement capabilities for mobile subscriber traffic inside GTP-U tunnel;

(4) support for post-quantum secure technologies including Quantum Key Distribution (QKD), Post-Quantum Cryptography (PQC) solutions (see, e.g., National Institute of Standards and Technology (NIST) proposals for the following: FIPS 203, Module-Lattice-Based Key-Encapsulation Mechanism Standard (available at https://csrc.nist.gov/pubs/fips/203/ipd), FIPS 204, Module-Lattice-Based Digital Signature Standard (available at https://csrc.nist.gov/pubs/fips/204/ipd), and FIPS 205, Stateless Hash-Based Digital Signature Standard (available at https://csrc.nist.gov/pubs/fips/205/ipd)); and (5) support for multiple intelligent traffic offload functionalities, such as disclosed in U.S. Pat. No. 11,665, 139, which is hereby incorporated by reference in its entirety, to significantly increase performance of the security gateway.

In some embodiments, a system/process/computer program product for applying a quantum ready intelligent security gateway includes monitoring network traffic on a mobile network at a security gateway (e.g., a quantum ready intelligent security gateway that supports quantum key distribution (QKD) and/or post-quantum cryptography (PQC) for providing a secure tunnel to the mobile network, such as by implementing the NIST proposals for the following: FIPS 203, Module-Lattice-Based Key-Encapsulation Mechanism Standard (available at https://csrc.nist.gov/pubs/fips/203/ipd), FIPS 204, Module-Lattice-Based Digital Signature Standard (available at https://csrc.nist.gov/pubs/fips/204/ipd), and FIPS 205, Stateless Hash-Based Digital Signature Standard (available at https://csrc.nist.gov/pubs/fips/205/ipd)) to identify a new session; determining meta information associated with the new session by extracting the meta information from the network traffic via one or more interfaces; and enforcing a security policy on the new session at the security gateway based on the meta information to apply context-based security in the mobile network.

For example, the security gateway can include a quantum ready intelligent security gateway that supports intelligent offloading of the monitored network traffic based on an offloading policy.

As another example, the security gateway can be configured with a plurality of security policies to apply subscriber-ID based security, equipment-ID based security, and/or network slice-ID based security in the mobile network.

As yet another example, the security gateway can be configured with a plurality of security policies to apply vulnerability protection, intrusion prevention, antivirus, antispyware, DNS security, denial of service (DOS) protection, and/or cloud-based security.

In some embodiments, a system/process/computer program product for applying a quantum ready intelligent security gateway further includes performing level threat identification and prevention in the mobile network.

In some embodiments, a system/process/computer program product for applying a quantum ready intelligent security gateway further includes performing application identification and control in the mobile network.

In some embodiments, a system/process/computer program product for applying a quantum ready intelligent security gateway further includes performing URL filtering in the mobile network.

In some embodiments, a system/process/computer program product for applying a quantum ready intelligent security gateway further includes blocking the new session from accessing a resource based on the security policy.

In some embodiments, a system/process/computer program product for applying a quantum ready intelligent security gateway further includes allowing the new session to access a resource based on the security policy.

In an example implementation, the disclosed quantum ready intelligent security gateway facilitates quantum ready security gateway functionality with high performance, provides multiple intelligent traffic offload functionalities, and provides mobile identities and context level visibility and enforcement in mobile network environments for enhanced security.

In addition, the disclosed quantum ready intelligent security gateway supports post-quantum secure technologies, including Quantum Key Distribution (QKD) and/or Post-Quantum Cryptography (PQC).

Further, the disclosed quantum ready intelligent security gateway can provide security services, including, for example, vulnerability protection/IPS, antivirus, anti-spyware, cloud security integration, DNS security, and DoS protection.

Moreover, the disclosed quantum ready intelligent security gateway solution provides a security gateway (SEG) solution for Enterprise customers with identity-based security combined with VPN technology to facilitate zero trust in private mobile networks.

As such, the disclosed techniques for a quantum ready intelligent security gateway facilitate enhanced security in mobile networks.

Accordingly, new and improved security solutions that facilitate applying security (e.g., network-based security) using the disclosed quantum ready intelligent security gateway in mobile networks (e.g., the quantum ready intelligent security gateway can be implemented using a firewall (FW)/ Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) (e.g., a 4G/5G/later versions of mobile networks) on various interfaces (e.g., N2, N3, S1-U, S11, etc.) and protocols (e.g., GTP-U, IPsec, NGAP, SIAP, etc.) in mobile network environments are disclosed in accordance with some embodiments.

These and other embodiments and examples for applying a quantum ready intelligent security gateway in mobile networks will be further described below.

Example System Architectures for Applying a Quantum Ready Intelligent Security Gateway Accordingly, in some embodiments, the disclosed techniques include providing a quantum ready intelligent security gateway (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, GTP-U sessions (e.g., GTP-U traffic) over various interfaces (e.g., RESTful APIs, S1-U, N3, and/or other interfaces in a core 4G/LTE, 5G, and later mobile networks) to apply security on traffic in mobile networks based on a policy (e.g., layer-7 security and/or other security policy enforcement) as further described below.

Specifically, as will now be described with respect to various system embodiments, context-based security can be applied using a quantum ready intelligent security gateway in mobile networks, including 4G/LTE, 5G, and later mobile networks, as will be further described below with respect to various embodiments. In an example implementation, context-based security can be applied using a quantum ready intelligent security gateway in mobile networks based on one or more of the following: a subscriber/user including IMSI, IMEI, RAT type, Network Slice, DNN/APN, location, user IP, and/or other contextual information. The quantum ready intelligent security gateway can be deployed on, for example, an S1-U and/or S11 interfaces in a 4G/LTE network and an N3 and/or N4 interfaces in a 5G network.

FIG. 1A is a block diagram of a first example service deployment architecture of a 5G and 4G mobile network with a quantum ready intelligent security gateway in accordance with some embodiments.

Specifically, FIG. 1A is a first example of a service deployment architecture of a 5G and 4G mobile network that includes a quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., S1-U, S11, and/or other interfaces in a 4G/LTE core network, and N2 and/or other interfaces in a 5G core network) in mobile networks (e.g., 4G/LTE or later mobile networks) as further described below.

As referred to herein, IMSI is the concept referred to by ITU-T as the "International Mobile Subscription Identity." IMSI is a 14 or 15 digit number.

As also referred to herein, SUPI is a globally unique 5G "Subscription Permanent Identifier" allocated to each subscriber in the 5G system. As per 3GPP T.S 23.003 version 16.9.0, a SUPI type may indicate an IMSI, a network access identifier (NAI), a Global Line Identifier (GLI), or a Global Cable Identifier (GCI).

As also referred to herein, International Mobile Equipment Identifier (IMEI) is defined in 3GPP TS 23.003 available at https://portal.3gpp.org/desktopmodules/Specifications/SpecificationDetails.aspx?specificationId=729.

As shown in FIG. 1A, the 5G mobile network environment can also include a 5G Radio Access Network (RAN) access as shown at 106A, a 4G Radio Access Network (RAN) access as shown at 106B, and/or other networks including, for example, Wi-Fi access and Fixed access (not shown), to facilitate data communications for subscribers (e.g., using User Equipment (UE), such as smart phones, laptops, computers (which may be in a fixed location), and Internet of Things (IoT) devices and/or other cellular enabled computing devices/equipment as shown at 104, and/or other network communication enabled devices, including over a Packet Data Network (PDN) (e.g., the Internet) 120 to access various applications, web services, content hosts, etc. and/or other networks). Each of the above-described 4G/LTE and 5G network access mechanisms are in secure communication with a 4G/LTE and 5G Core Network 110. Specifically, 5G RAN 106A and 4G RAN 106B are in IPSec communications (e.g., including management plane and communication plane communications over an N2 interface and an S1 interface, respectively) as shown.

Referring to 5G Core and 4G Core (EPC) mobile network 110, UPF and PGW-U 112 is in communication with PDN (Internet) 120. Security Gateway 102 is in communication (e.g., control plane communications) with a Mobility Management Entity (MME) 111 via an S1-MME interface. Security Gateway 102 is also in communication (e.g., management plane communications via an N2 interface) with an Operation, Administration, and Maintenance (OAM) 115. As also shown, 5G Core and 4G Core (EPC) mobile network 110 further includes a Session Management Function (SMF) and Packet Gateway Control Plane (PGW-C) 113 (e.g., in control plane communications with Security Gateway 102 via an N2 interface to access UE IP, IMEI, IMSI, and/or other contextual information as will be further described below), a Dynamic Host Control Protocol (DHCP) Server 116, and a Registration Authority (RA)/Certificate Authority (CA) 118.

Referring to FIG. 1A, network traffic communications are monitored using Security Gateway 102. As shown, network traffic communications are monitored/filtered in the 5G Core and 4G Core (EPC) mobile network 110 using Security Gateway 102 (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., S1-U, S11, S1, N2, and/or other interfaces in 5G Core and 4G Core (EPC) mobile network 110) in mobile networks as similarly described above and as further described below.

In this example implementation, the disclosed techniques for applying a quantum ready intelligent security gateway can be performed using a security platform deployed in a 4G/LTE and 5G technology-based mobile network, such as shown in FIG. 1A. Specifically, Security Gateway 102 can be configured to implement one or more quantum ready security protocol algorithms (e.g., support for post-quantum secure technologies including Quantum Key Distribution (QKD), Post-Quantum Cryptography (PQC) solutions (see, e.g., NIST proposals for the following: FIPS 203, Module-Lattice-Based Key-Encapsulation Mechanism Standard (available at https://csrc.nist.gov/pubs/fips/203/ipd), FIPS 204, Module-Lattice-Based Digital Signature Standard (available at https://csrc.nist.gov/pubs/fips/204/ipd), and FIPS 205, Stateless Hash-Based Digital Signature Standard (available at https://csrc.nist.gov/pubs/fips/205/ipd))) and applying context-based security in mobile networks over various interfaces (e.g., S1-U, S11, and/or other interfaces in a 4G/LTE core network, and N2 interfaces and/or other interfaces in a 5G core network) in mobile networks (e.g., 4G/LTE or later mobile networks) as further described below.

In some embodiments, Security Gateway 102 is further configured to provide the following DPI capabilities: DPI of IP traffic over the N2 interface. In an example implementation, the security platform is configured to provide DPI capabilities (e.g., including to identify an APP ID, a user ID, a content ID, perform URL filtering, etc.) of, for example, IP sessions over N2 and/or other interfaces between UPF and PGW-U 112 and PDN 120 to apply security on user plane traffic based on a policy (e.g., layer-7 security and/or other security policy enforcement) as further described below.

In addition, Security Gateway 102 can also be in network communication with a Cloud Security Service 122 (e.g., a commercially available cloud-based security service, such as the WildFire™ (WF) cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the security platforms with dynamic prevention signatures for malware, DNS, URLs, CNC malware, and/or other malware as well as to receive malware samples for further security analysis.

Figure 1B:
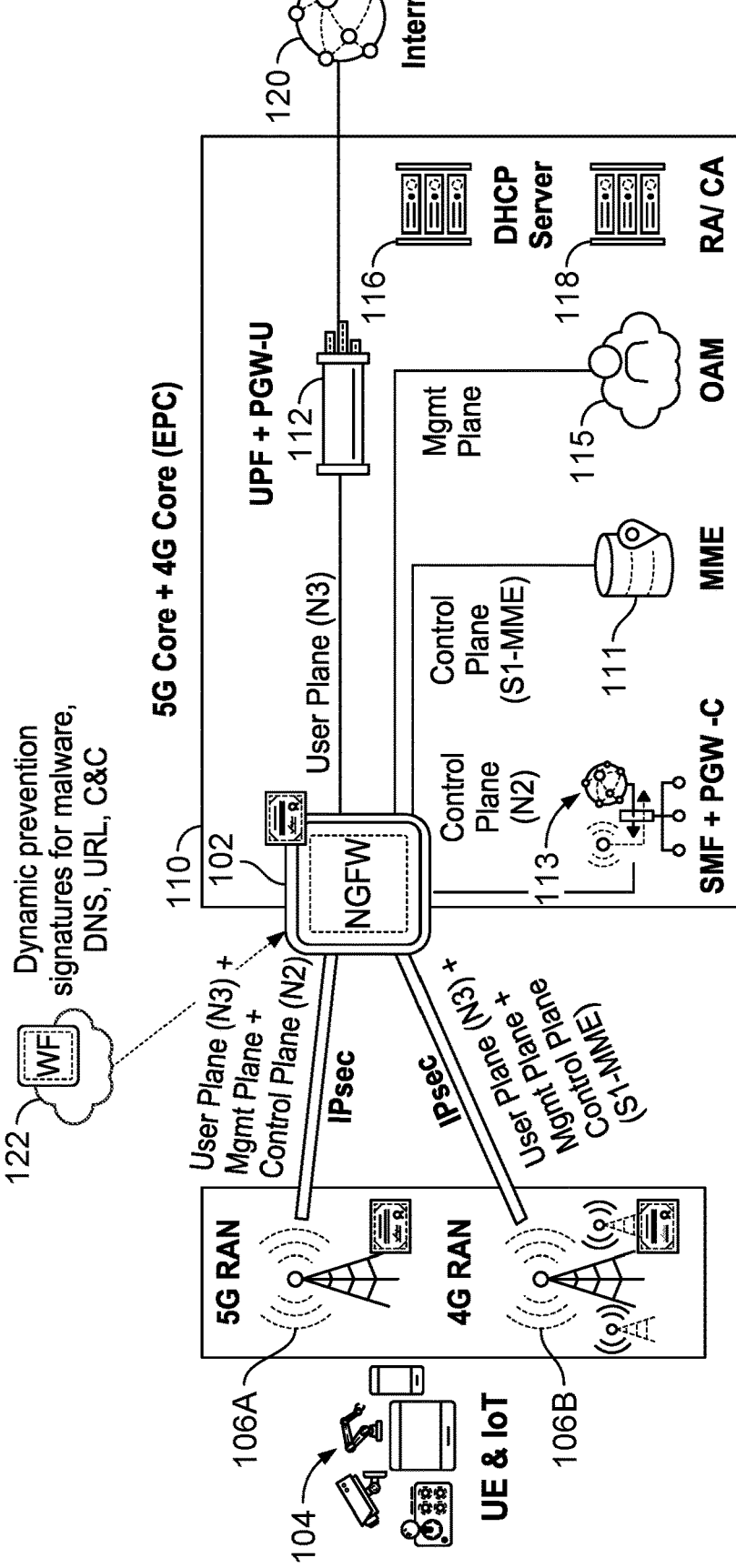
FIG. 1B is a block diagram of a second example service deployment architecture of a 5G and 4G mobile network with a quantum ready intelligent security gateway in accordance with some embodiments.

FIG. 1B is a block diagram of a second example service deployment architecture of a 5G and 4G mobile network with a quantum ready intelligent security gateway in accordance with some embodiments.

Specifically, FIG. 1B is a second example of a service deployment architecture of a 5G and 4G mobile network that includes quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., S1-U, S11, and/or other interfaces in a 4G/LTE core network, and N3 and/or other interfaces in a 5G core network) in mobile networks (e.g., 4G/LTE or later mobile networks) as further described below.

As shown in FIG. 1B, each of the above-described 4G/LTE and 5G network access mechanisms are in secure communication with a 4G/LTE and 5G Core Network 110 as similarly described above with respect to FIG. 1A. Specifically, in this second example of a service deployment architecture of a 5G and 4G mobile network with quantum ready intelligent Security Gateway 102, 5G RAN 106A and 4G RAN 106B are in IPSec communications (e.g., including user plane and management plane over an N3 interface as well as control plane communications over N2 and S1-MME interfaces, respectively). As also shown, quantum ready intelligent Security Gateway 102 is in control plane communications with SMF and PGW-C 113 via an N2 interface, communications with MME 111 via an S1-MME interface, user plane communications with UPF and PGW-U 112 via an N3 interface, and management plane communications with OAM 115 via an N3 interface, as shown.

Figure 1C:
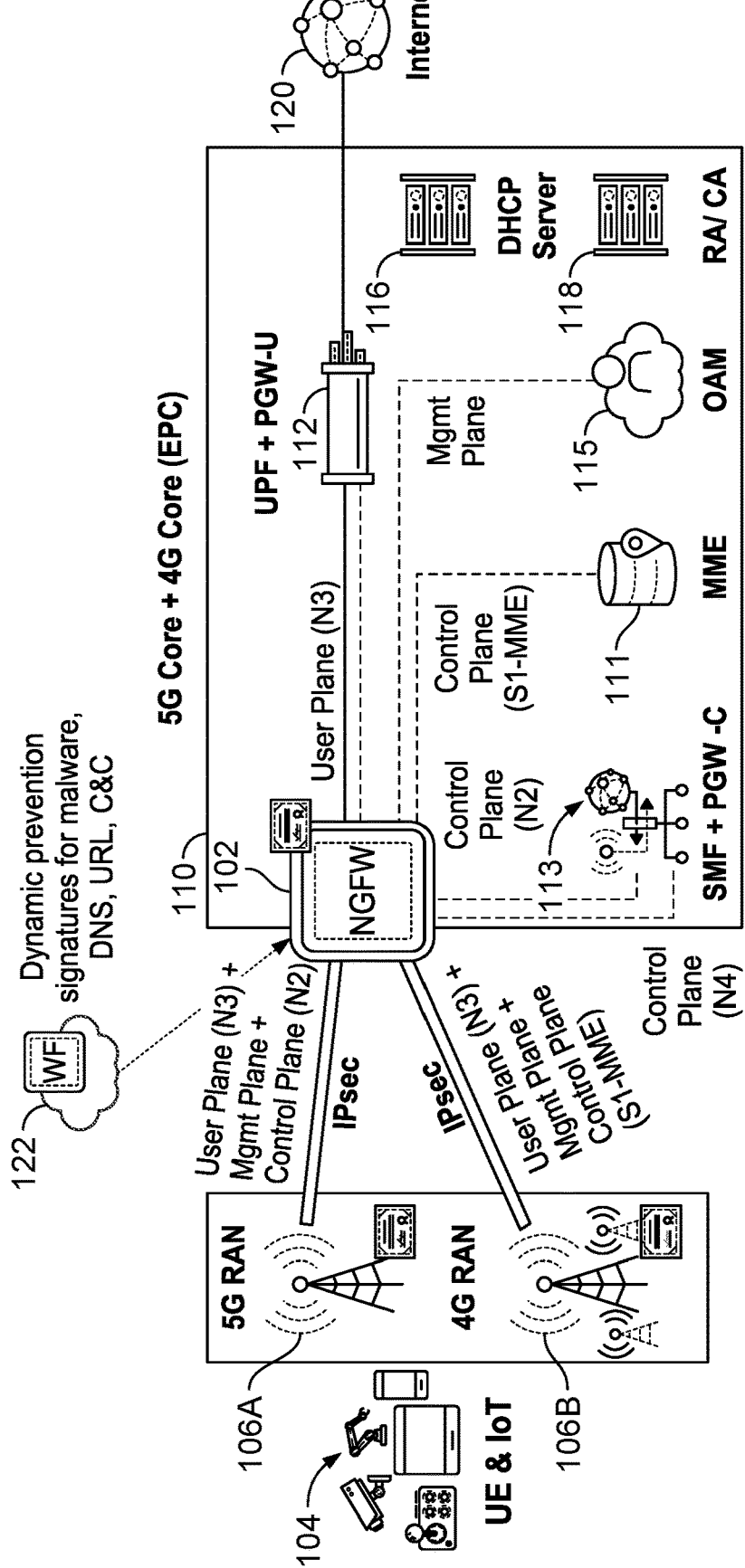
FIG. 1C is a block diagram of a third example service deployment architecture of a 5G and 4G mobile network with a quantum ready intelligent security gateway in accordance with some embodiments.

FIG. 1C is a block diagram of a third example service deployment architecture of a 5G and 4G mobile network with a quantum ready intelligent security gateway in accordance with some embodiments.

Specifically, FIG. 1C is a third example of a service deployment architecture of a 5G and 4G mobile network that includes quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., S1-U, S11, and/or other interfaces in a 4G/LTE core network, and N3 and/or other interfaces in a 5G core network) in mobile networks (e.g., 4G/LTE or later mobile networks) as further described below.

As shown in FIG. 1C, each of the above-described 4G/LTE and 5G network access mechanisms are in secure communication with a 4G/LTE and 5G Core Network 110 as similarly described above with respect to FIG. 1A. Specifically, in this third example of a service deployment architecture of a 5G and 4G mobile network with quantum ready intelligent Security Gateway 102, 5G RAN 106A and 4G RAN 106B are in IPSec communications (e.g., including user plane and management plane over an N3 interface as well as control plane communications over N2 and S1-MME interfaces, respectively). As also shown, quantum ready intelligent Security Gateway 102 is in control plane communications with SMF and PGW-C 113 via N2 and/or other interfaces, communications with MME 111 via an S1-MME interface, user plane communications with UPF and PGW-U 112 via an N3 interface, and management plane communications with OAM 115 via an N3 interface, as shown.

Figure 1D:
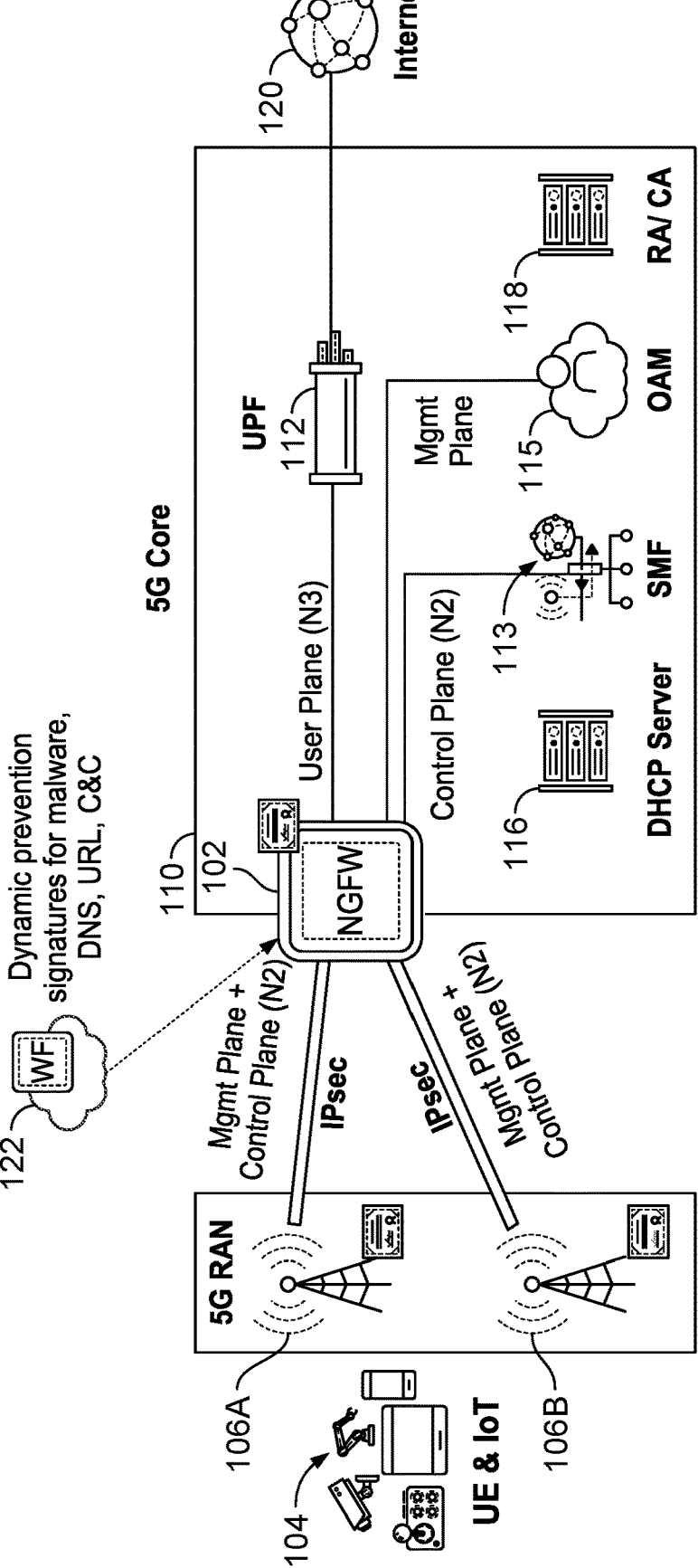
FIG. 1D is a block diagram of a fourth example service deployment architecture of a 5G mobile network with a quantum ready intelligent security gateway in accordance with some embodiments.

FIG. 1D is a block diagram of a fourth example service deployment architecture of a 5G mobile network with a quantum ready intelligent security gateway in accordance with some embodiments.

Specifically, FIG. 1D is a fourth example of a service deployment architecture of a 5G mobile network that includes quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., N2, N3, and/or other interfaces in a 5G core network) in mobile networks (e.g., 5G or later mobile networks) as further described below.

As shown in FIG. 1D, each of the above-described 5G network access mechanisms are in secure communication with 5G Core Network 110 as similarly described above with respect to FIG. 1A. Specifically, in this fourth example of a service deployment architecture of a 5G mobile network with quantum ready intelligent Security Gateway 102, 5G RAN 106A and 5G RAN 106B are in IPSec communications (e.g., including management plane and control plane communications over an N2 interface) as shown. As also shown, quantum ready intelligent Security Gateway 102 is in user plane communications over an N3 interface with UPF 112, and is in control plane communications over an N2 interface with SMF 113 and for management plane communications over an N2 interface with OAM 115) as shown.

Figure 1E:
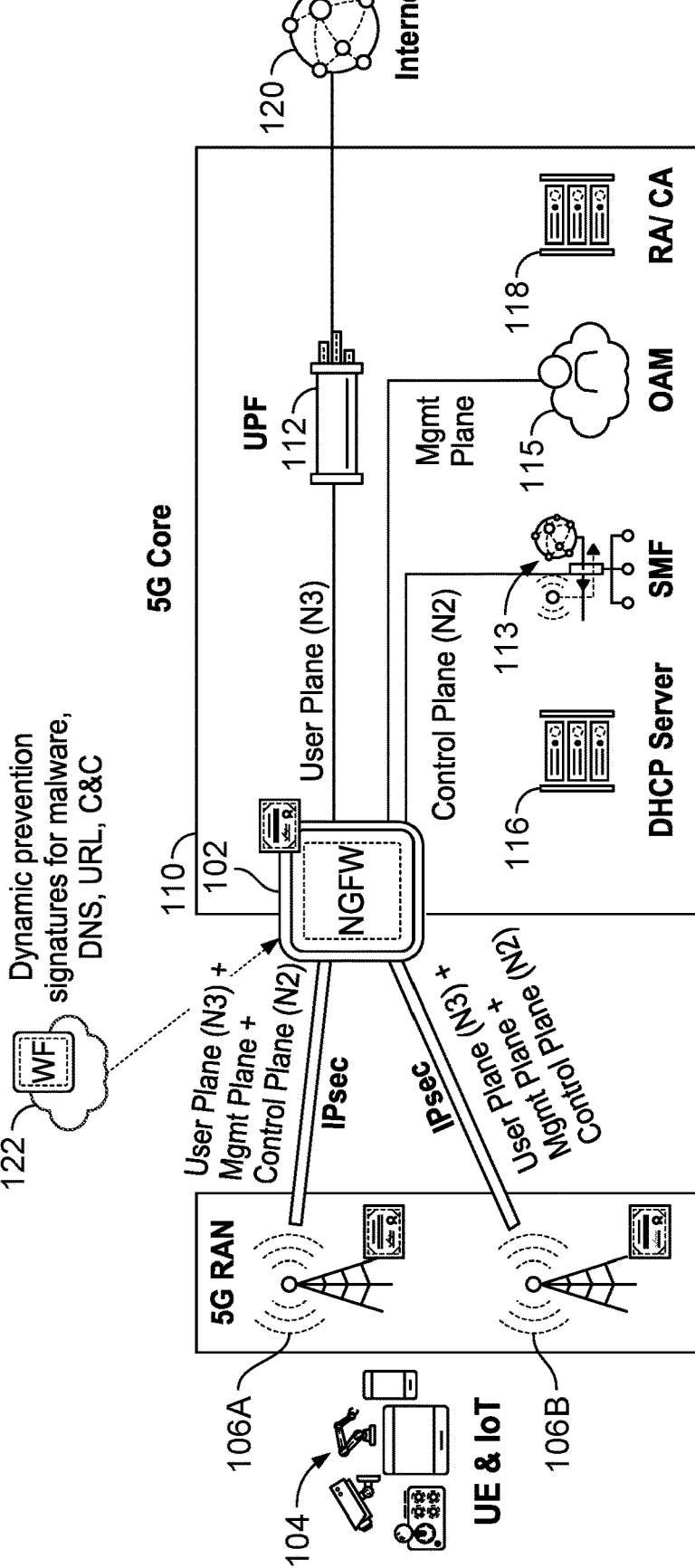
FIG. 1E is a block diagram of a fifth example service deployment architecture of a 5G mobile network with a quantum ready intelligent security gateway in accordance with some embodiments.

FIG. 1E is a block diagram of a fifth example service deployment architecture of a 5G mobile network with a quantum ready intelligent security gateway in accordance with some embodiments.

Specifically, FIG. 1E is a fifth example of a service deployment architecture of a 5G mobile network that includes quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., N2, N3, and/or other interfaces in a 5G core network) in mobile networks (e.g., 5G or later mobile networks) as further described below.

As shown in FIG. 1E, each of the above-described 5G network access mechanisms are in secure communication with 5G Core Network 110 as similarly described above with respect to FIG. 1A. Specifically, in this fifth example of a service deployment architecture of a 5G mobile network with quantum ready intelligent Security Gateway 102, 5G RAN 106A and 5G RAN 106B are in IPSec communications (e.g., including user plane communications over an N3 interface and management plane and control plane over an N2 interface) as shown. As also shown, quantum ready intelligent Security Gateway 102 is in user plane communications over an N3 interface with UPF 112, and is in control plane communications over an N2 interface with SMF 113 and for management plane communications over an N2 interface with OAM 115) as shown.

Figure 1F:
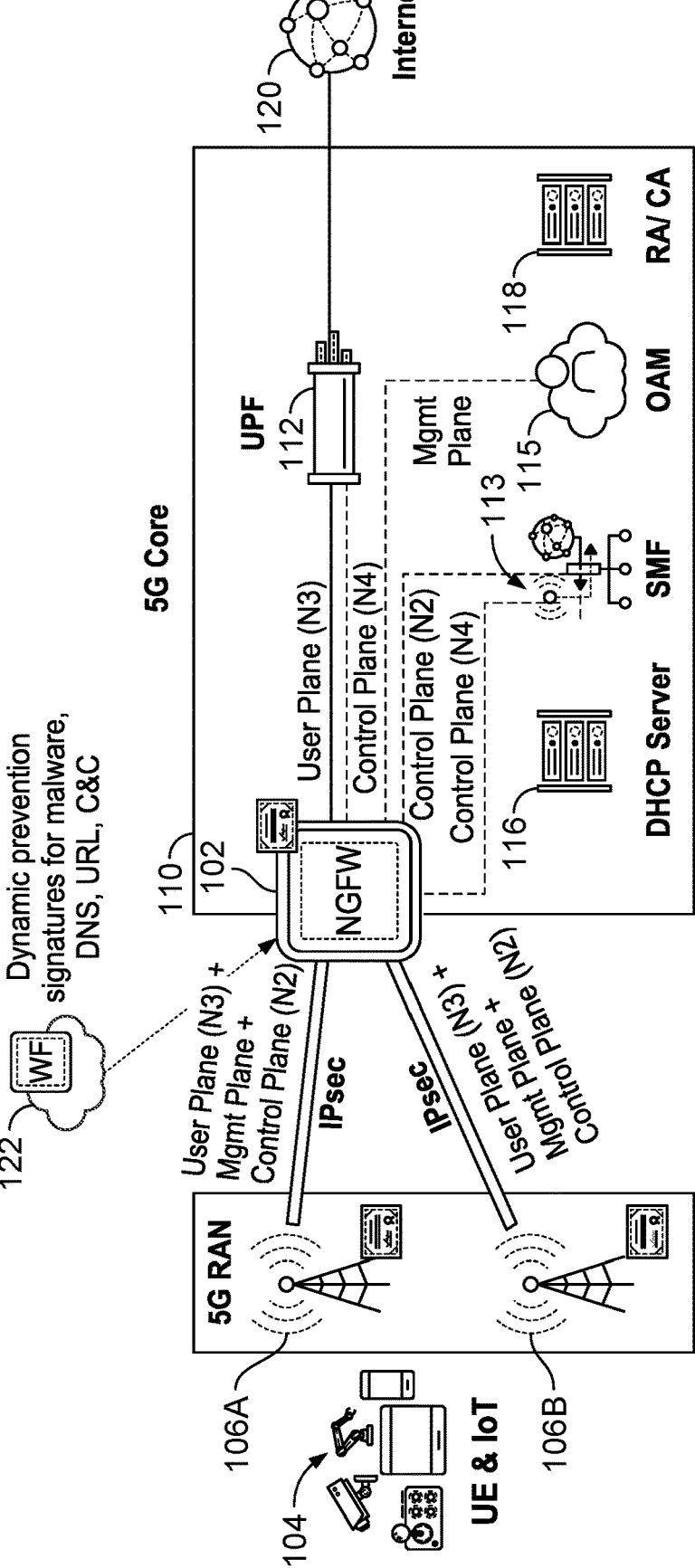
FIG. 1F is a block diagram of a sixth example service deployment architecture of a 5G mobile network with a quantum ready intelligent security gateway in accordance with some embodiments.

FIG. 1F is a block diagram of a sixth example service deployment architecture of a 5G mobile network with a quantum ready intelligent security gateway in accordance with some embodiments.

Specifically, FIG. 1F is a sixth example of a service deployment architecture of a 5G mobile network that includes quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., N2, N3, and/or other interfaces in a 5G core network) in mobile networks (e.g., 5G or later mobile networks) as further described below.

As shown in FIG. 1F, each of the above-described 5G network access mechanisms are in secure communication with 5G Core Network 110 as similarly described above with respect to FIG. 1A. Specifically, in this sixth example of a service deployment architecture of a 5G mobile network with quantum ready intelligent Security Gateway 102, 5G RAN 106A and 5G RAN 106B are in IPSec communications (e.g., including user plane communications over an N3 interface as well as management plane and control plane communications over an N2 interface). As also shown, quantum ready intelligent Security Gateway 102 is in user plane communications over an N3 interface with UPF 112, and is in control plane communications over N2 and N4 interfaces with SMF 113, in which intelligence can be collected via the N4 interface for mapping UE IP, IMEI, IMSI, location, network slice, and/or other contextual information for applying security as similarly described herein, and for management plane communications over an N2 interface with OAM 115 as shown.

Figure 1G:
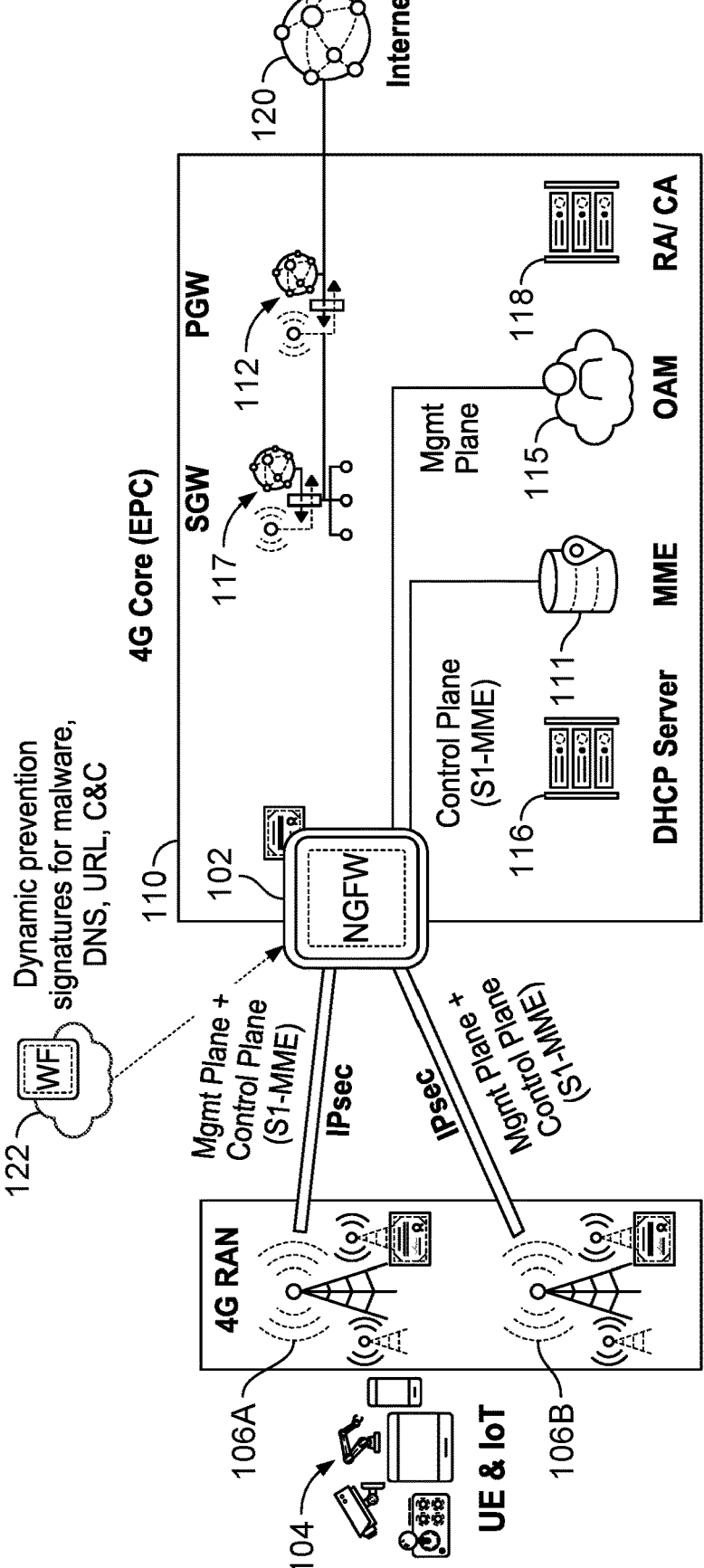
FIG. 1G is a block diagram of a seventh example service deployment architecture of a 4G/LTE mobile network with a quantum ready intelligent security gateway in accordance with some embodiments.

FIG. 1G is a block diagram of a seventh example service deployment architecture of a 4G/LTE mobile network with a quantum ready intelligent security gateway in accordance with some embodiments.

Specifically, FIG. 1G is a seventh example of a service deployment architecture of a 4G/LTE mobile network that includes quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., S1-MME interface and/or other interfaces in a 4G/LTE core network) in mobile networks as further described below.

As shown in FIG. 1G, each of the above-described 4G/LTE network access mechanisms are in secure communication with 4G Core (EPC) Network 110 as similarly described above with respect to FIG. 1A. Specifically, in this seventh example of a service deployment architecture of a 4G/LTE mobile network with quantum ready intelligent Security Gateway 102, 4G RAN 106A and 4G RAN 106B are in IPSec communications (e.g., including management plane and control plane communications over an S1-MME interface) as shown. As also shown, quantum ready intelligent Security Gateway 102 is in control plane communications over an S1-MME interface with MME 111, and management plane communications over an S1-MME interface with OAM 115 as shown.

Figure 1H:
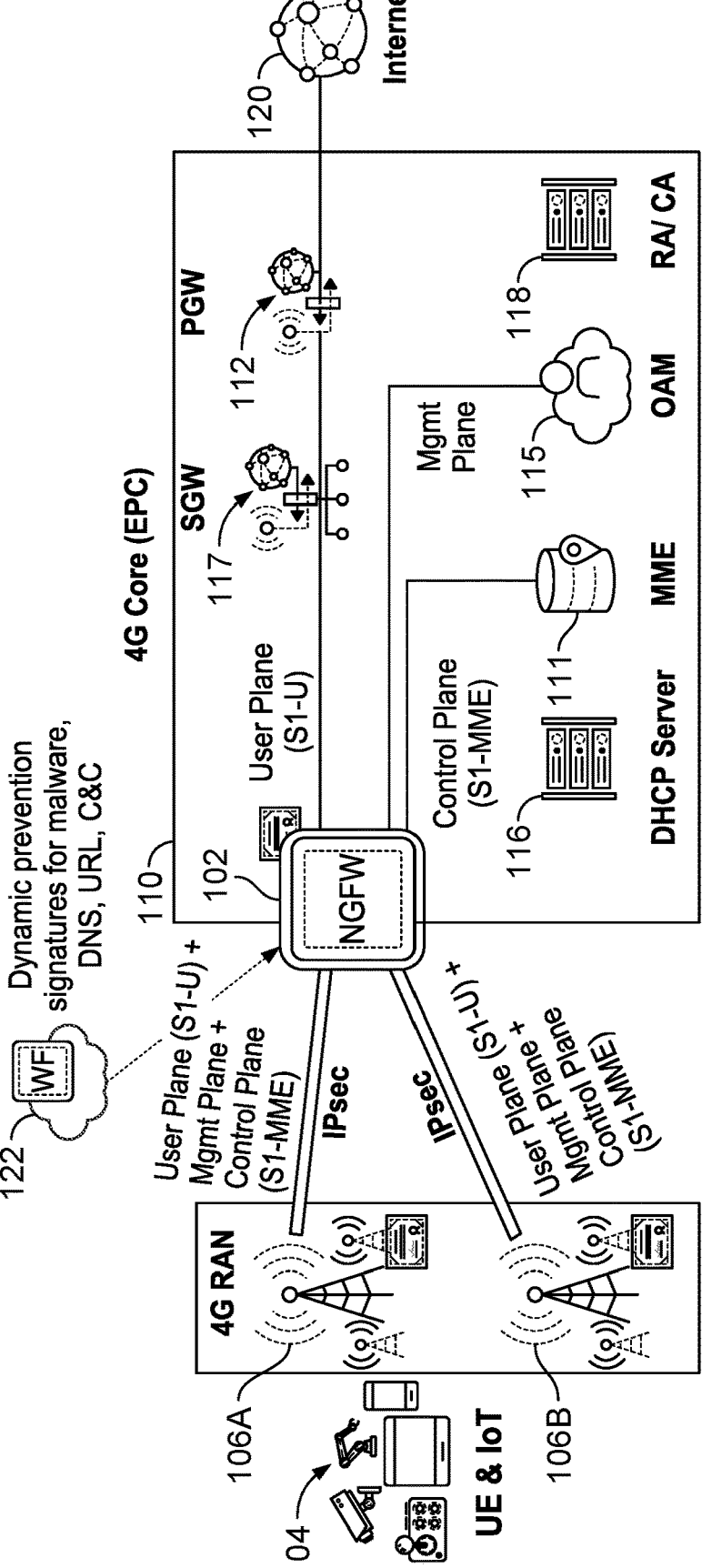
FIG. 1H is a block diagram of an eighth example service deployment architecture of a 4G/LTE mobile network with a quantum ready intelligent security gateway in accordance with some embodiments.

FIG. 1H is a block diagram of an eighth example service deployment architecture of a 4G/LTE mobile network with a quantum ready intelligent security gateway in accordance with some embodiments.

Specifically, FIG. 1H is an eighth example of a service deployment architecture of a 4G/LTE mobile network that includes quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., S1-MME interface and/or other interfaces in a 4G/LTE core network) in mobile networks as further described below.

As shown in FIG. 1H, each of the above-described 4G/LTE network access mechanisms are in secure communication with 4G Core (EPC) Network 110 as similarly described above with respect to FIG. 1A. Specifically, in this eighth example of a service deployment architecture of a 4G/LTE mobile network with quantum ready intelligent Security Gateway 102, 4G RAN 106A and 4G RAN 106B are in IPSec communications (e.g., including user plane communications over an S1-U interface, and management plane and control plane communications over an S1-MME interface) as shown. As also shown, quantum ready intelligent Security Gateway 102 is in user plane communications over an S1-U interface with SGW 117, control plane communications over an S1-MME interface with MME 111, and management plane communications over an S1-MME interface with OAM 115 as shown.

Figure 1I:
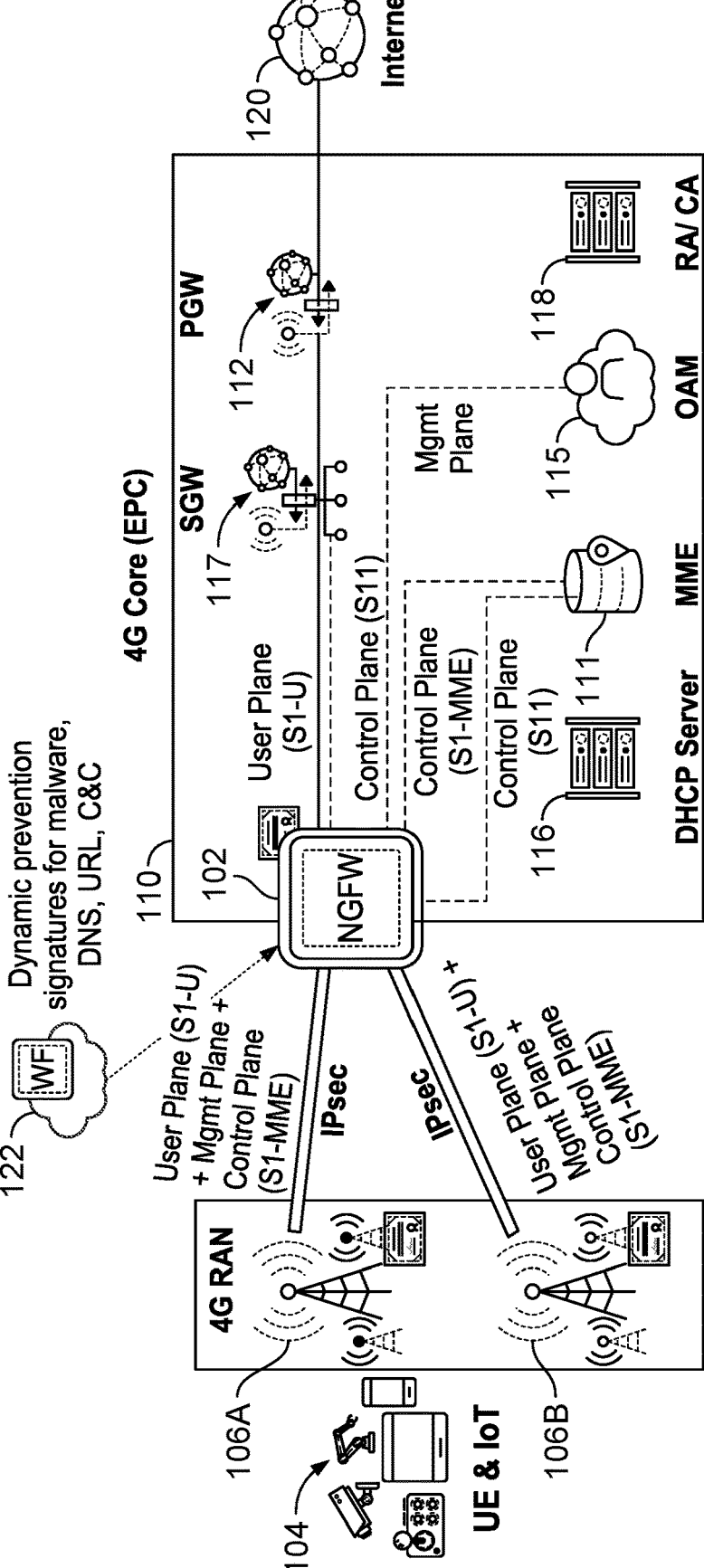
FIG. 1I is a block diagram of a ninth example service deployment architecture of a 4G/LTE mobile network with a quantum ready intelligent security gateway in accordance with some embodiments.

FIG. 1I is a block diagram of a ninth example service deployment architecture of a 4G/LTE mobile network with a quantum ready intelligent security gateway in accordance with some embodiments.

Specifically, FIG. 1I is an ninth example of a service deployment architecture of a 4G/LTE mobile network that includes quantum ready intelligent Security Gateway 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., S1-MME interface and/or other interfaces in a 4G/LTE core network) in mobile networks as further described below.

As shown in FIG. 1I, each of the above-described 4G/LTE network access mechanisms are in secure communication with 4G Core (EPC) Network 110 as similarly described above with respect to FIG. 1A. Specifically, in this ninth example of a service deployment architecture of a 4G/LTE mobile network with quantum ready intelligent Security Gateway 102, 4G RAN 106A and 4G RAN 106B are in IPSec communications (e.g., including user plane communications over an S1-U interface, and management plane and control plane communications over an S1-MME interface) as shown. As also shown, quantum ready intelligent Security Gateway 102 is in user plane communications over an S1-U interface and control plane communications over an S11 interface with SGW 117, in which intelligence can be collected via the S11 interface for mapping UE IP, IMEI, IMSI, and/or other contextual information for applying security as similarly described herein, and is in control plane communications over S1-MME and S11 interfaces with MME 111 and for management plane communications with OAM 115 over an S1-MME interface) as shown.

Figure 2A:
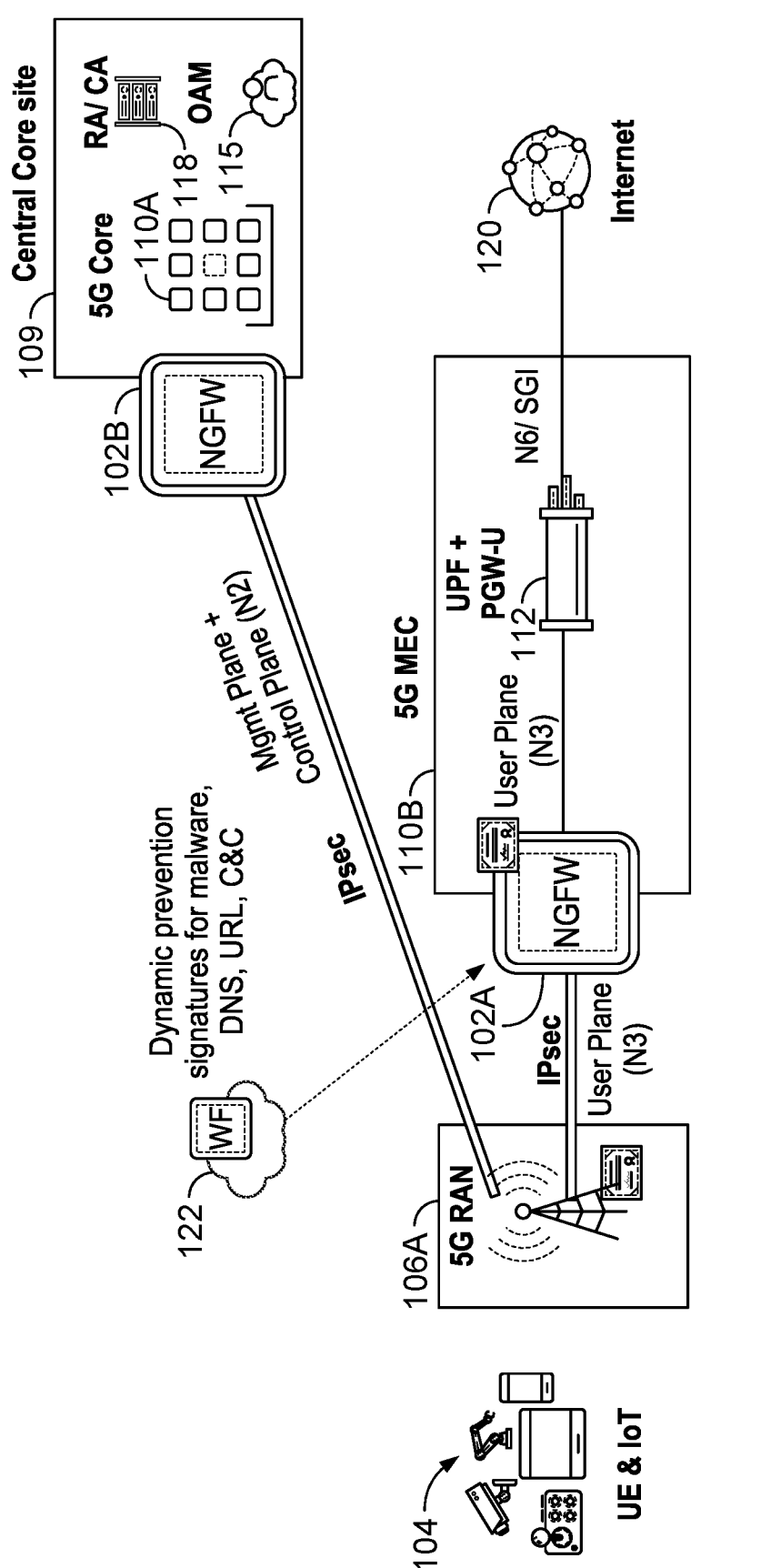
FIG. 2A is a block diagram of a first example enterprise deployment architecture of a 5G mobile network with Mobile Edge Computing (MEC) with a quantum ready intelligent security gateway in accordance with some embodiments.

FIG. 2A is a block diagram of a first example enterprise deployment architecture of a 5G mobile network with Mobile Edge Computing (MEC) with a quantum ready intelligent security gateway in accordance with some embodiments.

Specifically, FIG. 2A is a first example enterprise deployment architecture of a 5G mobile network with MEC that includes quantum ready intelligent Security Gateways 102A and 102B (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., N2 and N3 interfaces and/or other interfaces in a 5G core network) in mobile networks (e.g., 5G or later mobile networks) as further described below.

As shown in FIG. 2A, the 5G mobile network environment can also include a 5G Radio Access Network (RAN) access as shown at 106A, and/or other networks including, for example, Wi-Fi access and Fixed access (not shown), to facilitate data communications for subscribers (e.g., using User Equipment (UE), such as smart phones, laptops, computers (which may be in a fixed location), and Internet of Things (IoT) devices and/or other cellular enabled computing devices/equipment as shown at 104, and/or other network communication enabled devices, including over a Packet Data Network (PDN) (e.g., the Internet) 120 to access various applications, web services, content hosts, etc. and/or other networks). Each of the above-described 5G network access mechanisms are in secure communication with a 5G Core Network 110A in Central Core site 109 and a 5G MEC 110B. Specifically, 5G RAN 106A is in IPSec communication with Security Gateway 102A (e.g., including user plane communications over an N3) and is in IPSec communication with Security Gateway 102B (e.g., including management plane and communication plane communications over an N2 interface) as shown.

Referring to 5G MEC 110B, Security Gateway 102A is in communication (e.g., user plane communications) with a User Plane Function (UPF) and a Packet Gateway User Plane (PGW-U) 112 via an N3 interface. UPF and PGW-U 112 is in communication with PDN (Internet) 120 via an N3, N4/S1-U, S11 interface in which Security Gateway 102A is located in line between UPF and PGW-U 112 and PDN 120. Security Gateway 102A is in communication with UPF and PGW-U 112 (e.g., via the N3, N4 interface, as shown) to access UE IP, IMEI, IMSI, and/or other contextual information as will be further described below.

Referring to Central Core site 109 that includes 5G Core mobile network 110A, Security Gateway 102B is in communication (e.g., user plane communications) via an N2 interface for Central Core site 109. As also shown, Central Core site 109 also includes an Operation, Administration, and Maintenance (OAM) 115 and a Registration Authority (RA)/Certificate Authority (CA) 118.

Referring to FIG. 2A, network traffic communications are monitored using Security Gateways 102A and 102B. As shown, network traffic communications are monitored/filtered in the 5G MEC 110B and Central Core site 109 using Security Gateways 102A and 102B, respectively (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., S1-U, S11, S1, N2, N3, N4, and/or other interfaces in 5G MEC 110B and Central Core site 109) in mobile networks as similarly described above and as further described below.

In this example implementation, the disclosed techniques for applying a quantum ready intelligent security gateway can be performed using a security platform deployed in a 5G technology-based mobile network, such as shown in FIG.

2A. Specifically, Security Gateways 102A and 102B can be configured to implement one or more quantum ready security protocol algorithms (e.g., support for post-quantum secure technologies including Quantum Key Distribution (QKD), Post-Quantum Cryptography (PQC) solutions (see, e.g., NIST proposals for the following: FIPS 203, Module-Lattice-Based Key-Encapsulation Mechanism Standard (available at https://csrc.nist.gov/pubs/fips/203/ipd), FIPS 204, Module-Lattice-Based Digital Signature Standard (available at https://csrc.nist.gov/pubs/fips/204/ipd), and FIPS 205, Stateless Hash-Based Digital Signature Standard (available at https://csrc.nist.gov/pubs/fips/205/ipd))) and applying context-based security in mobile networks over various interfaces (e.g., S1-U, S11, S1, N2, N3, N4, and/or other interfaces in 5G MEC 110B and Central Core site 109) in mobile networks (e.g., 5G or later mobile networks) as further described below.

In some embodiments, Security Gateway 102A is further configured to provide the following DPI capabilities: DPI of IP traffic over the N4 interface. In an example implementation, the security platform is configured to provide DPI capabilities (e.g., including to identify an APP ID, a user ID, a content ID, perform URL filtering, etc.) of, for example, IP sessions over N3, N4 interfaces between UPF and PGW-U 112 and PDN 120 to apply security on user plane traffic based on a policy (e.g., layer-7 security and/or other security policy enforcement) as further described below.

In addition, Security Gateway 102A can also be in network communication with a Cloud Security Service 122 (e.g., a commercially available cloud-based security service, such as the WildFire™ (WF) cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the security platforms with dynamic prevention signatures for malware, DNS, URLs, CNC malware, and/or other malware as well as to receive malware samples for further security analysis.

Figure 2B:
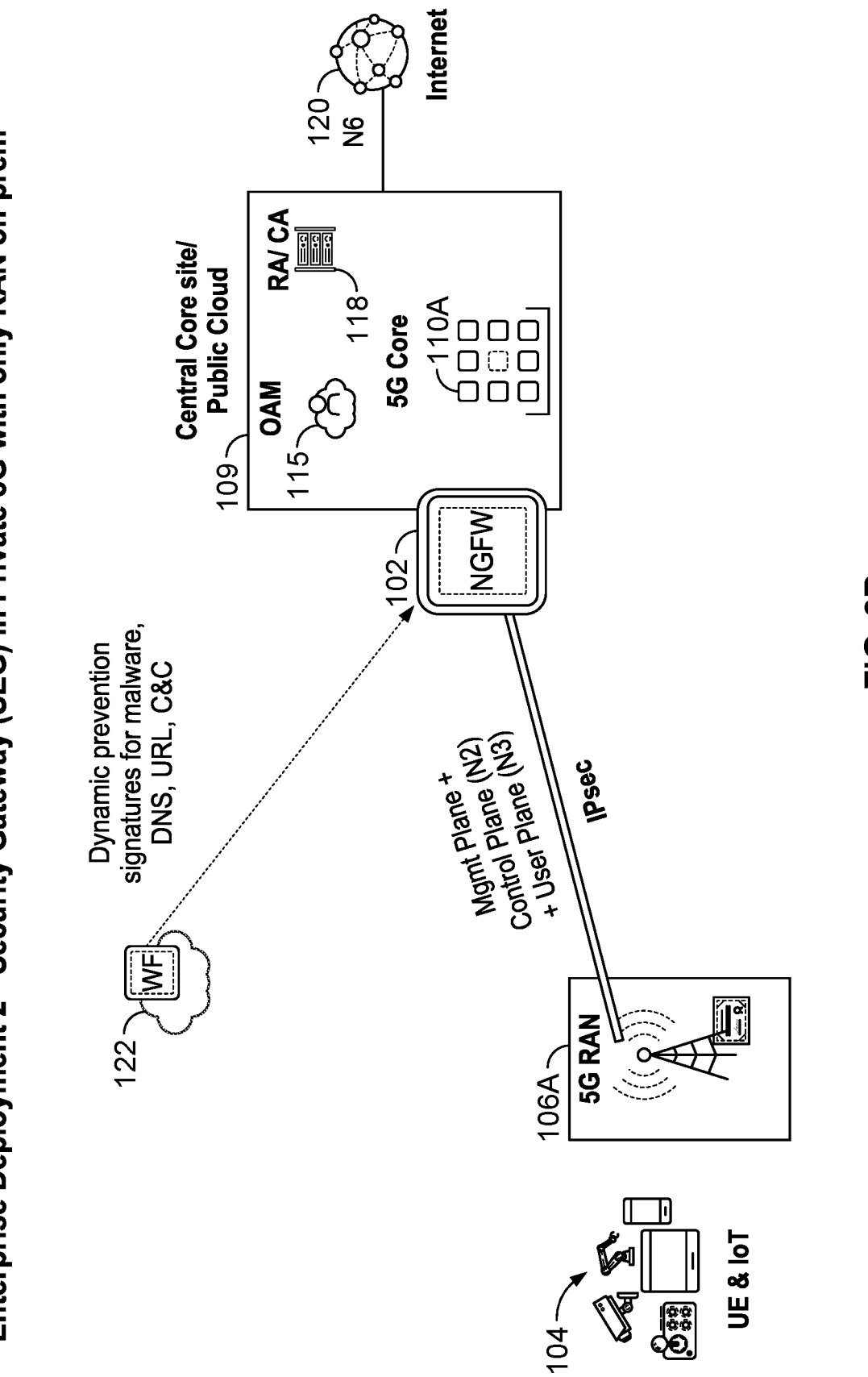
FIG. 2B is a block diagram of a second example enterprise deployment architecture of a private 5G mobile network with only RAN on-premises with a quantum ready intelligent security gateway in accordance with some embodiments.

FIG. 2B is a block diagram of a second example enterprise deployment architecture of a private 5G mobile network with only RAN on-premises with a quantum ready intelligent security gateway in accordance with some embodiments.

Specifically, FIG. 2B is a second example of a service deployment architecture of a private 5G mobile network with only RAN on-premises that includes quantum ready intelligent Security Gateway 102 (e.g., the security function (s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for implementing quantum ready security protocol algorithms and applying context-based security in mobile networks over various interfaces (e.g., N2, N3, N4 interfaces, and/or other interfaces in a 5G core network) in mobile networks (e.g., 5G or later mobile networks) as further described below.

As shown in FIG. 2B, each of the above-described 5G network access mechanisms are in secure communication with Central Core site/Public Cloud 109 that includes a 5G Core Network 110A as similarly described above with respect to FIG. 2A. Specifically, in this second example of a service deployment architecture of a private 5G mobile network with only RAN on-premises with quantum ready intelligent Security Gateway 102, 5G RAN 106A is in IPSec communications (e.g., including management plane and control plane communications over an N3 and user plane communications over an N2 interface), as shown.

As such, service providers and/or enterprises can use the disclosed techniques and security platform to apply a quantum ready intelligent security gateway.

Various example use cases for a quantum ready intelligent security gateway will now be described below.

Example Use Cases for a Quantum Ready Intelligent Security Gateway

The disclosed techniques for providing enhanced security for mobile/service provider networks using a security platform for security policy enforcement, including for applying context-based security using an API and a data store, can be applied in a variety of additional example use case scenarios for facilitating enhanced security for mobile networks (e.g., 4G/5G/6G and later mobile networks) as will now be described with respect to various example use cases.

As a first example use case, in a 4G/LTE and 5G mobile network of a service provider, a security gateway or similar device is configured to provide the following capabilities: (1) encrypt traffic including a control and management plane between 4G/5G base stations and the core mobile network; and (2) inspect control and management traffic for threats to detect and block any malicious activity (e.g., based on a security policy).

As a second example use case, in a 5G mobile network of a service provider, a security gateway or similar device is configured to provide the following capabilities: (1) encrypt traffic including a control and management plane between 5G base stations and the core mobile network; and (2) inspect only selected enterprise(s)/network slice(s) traffic for known and unknown threats (e.g., based on a security policy).

As a third example use case, the disclosed techniques for applying a quantum ready intelligent security gateway can be used in a private wireless network to encrypt traffic including a user, control, and management plane between a 4G base station and the core mobile network. In addition, a quantum ready intelligent security gateway can then inspect all north/south user traffic for known and unknown threats (e.g., based on a security policy).

As a fourth example use case, the disclosed techniques for applying a quantum ready intelligent security gateway can be used in a private wireless network to encrypt traffic including a user, control, and management plane between a 5G base station and the core mobile network. In addition, a quantum ready intelligent security gateway can then inspect all traffic including device-to-device traffic for known and unknown threats (e.g., based on a security policy).

As a fifth example use case, in a 5G private mobile network of a service provider, a security gateway or similar device is configured to provide the following capabilities: (1) encrypt traffic including a user, control and management plane between 5G base stations and core network; (2) inspect all control and management traffic; and (3) offload all video traffic, decrypt the encrypted subscriber traffic, inspect all subscriber and IoT/OT traffic other than video for known and unknown threats, and apply URL filtering to block malware, C&C, phishing, ransomware, and other malicious sites (e.g., based on a security policy).

As will now be apparent to one of ordinary skill in the art, the disclosed techniques for applying a quantum ready intelligent security gateway can be applied in a variety of additional example use case scenarios to detect/prevent these and other types of attacks for facilitating enhanced security for various deployments and environments in mobile networks.

Figure 3:
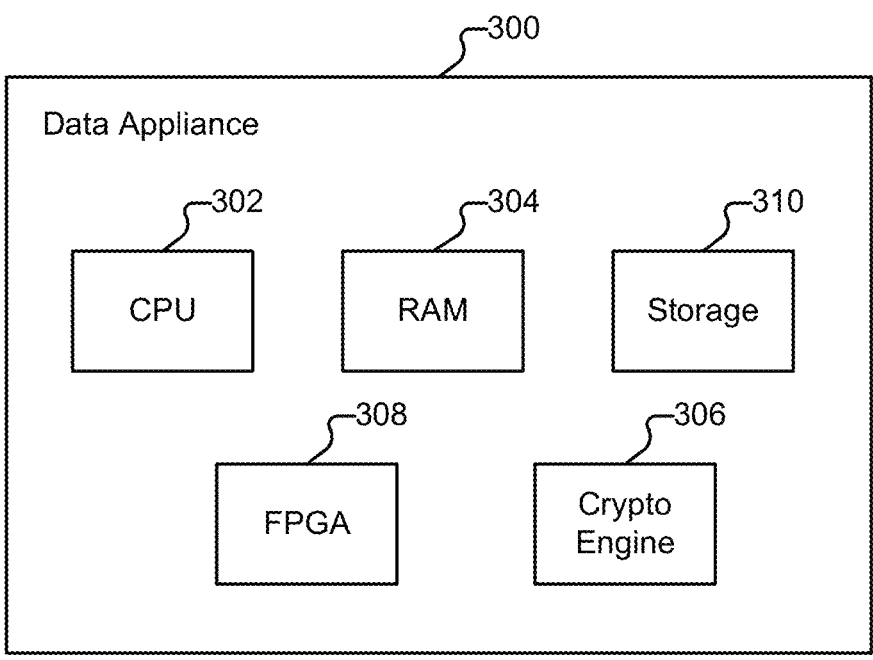
FIG. 3 is a functional diagram of hardware components of a network device for a quantum ready intelligent security gateway in accordance with some embodiments.

Example Hardware Components of a Network Device for a Quantum Ready Intelligent Security Gateway FIG. 3 is a functional diagram of hardware components of a network device for a quantum ready intelligent security gateway in accordance with some embodiments. The example shown is a representation of physical/hardware components that can be included in network device 300 (e.g., an appliance, gateway, or server that can implement the security gateway disclosed herein). Specifically, network device 300 includes a high performance multi-core CPU 302 and RAM 304. Network device 300 also includes a storage 310 (e.g., one or more hard disks or solid state storage units), which can be used to store policy and other configuration information as well as signatures. In one embodiment, storage 310 stores certain information (e.g., subscriber-ID, equipment-ID, and/or network slice-ID along with user-ID and syslog messages related/extracted parameters) that is extracted from monitored traffic over various interfaces (e.g., S1-U, S11, N3, N4, and/or other interfaces) that are monitored for implementing the disclosed security policy enforcement techniques for applying context-based security over various interfaces including the disclosed techniques for applying subscriber-ID based security, equipment-ID based security, and/or network slice-ID based security with user-ID and syslog messages in mobile networks using a security platform(s) as described herein. Network device 300 can also include one or more optional hardware accelerators. For example, network device 300 can include a cryptographic engine 306 configured to perform encryption and decryption operations, and one or more FPGAs 308 configured to perform signature matching, act as network processors, and/or perform other tasks.

Figure 4:
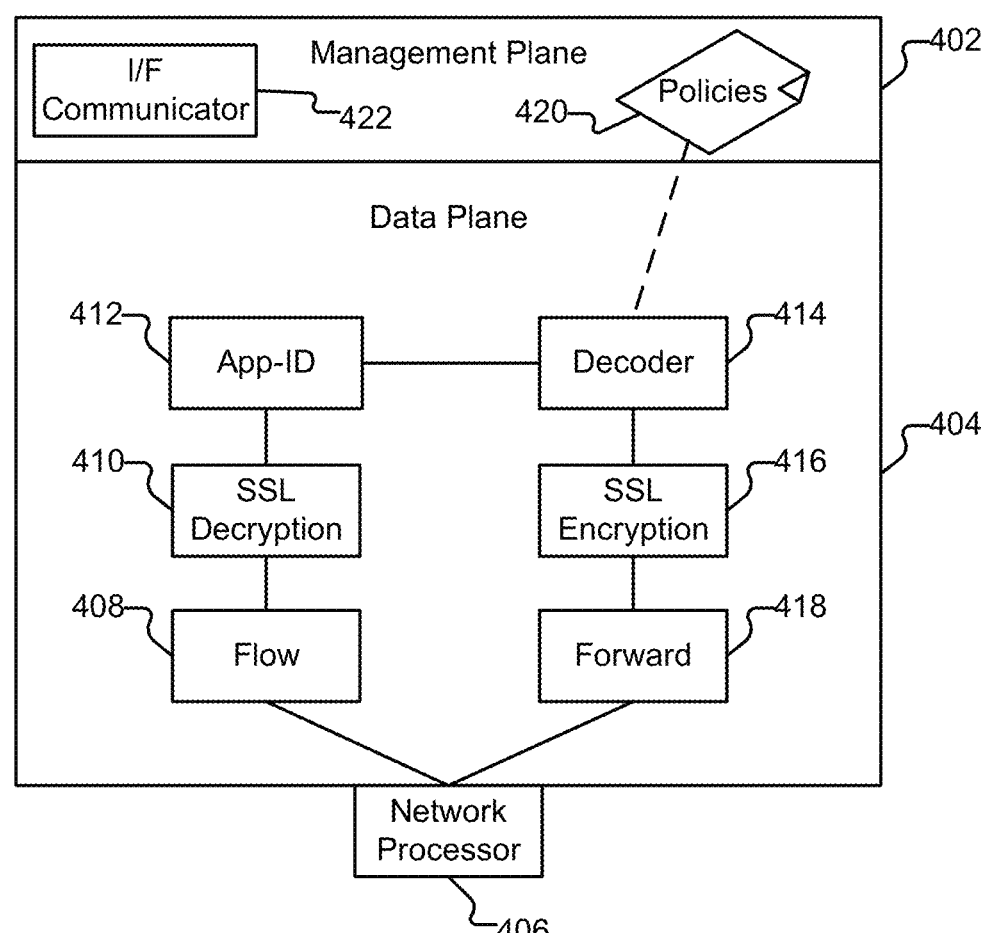
FIG. 4 is a functional diagram of logical components of a network device for a quantum ready intelligent security gateway in accordance with some embodiments.

Example Logical Components of a Network Device for a Quantum Ready Intelligent Security Gateway FIG. 4 is a functional diagram of logical components of a network device for a quantum ready intelligent security gateway in accordance with some embodiments. The example shown is a representation of logical components that can be included in network device 400 (e.g., a data appliance, which can implement the disclosed security gateway and perform the disclosed techniques for applying subscriber-ID based security, equipment-ID based security, network slice-ID based security with user-ID, and/or other context-based security over various interfaces in mobile networks). As shown, network device 400 includes a management plane 402 and a data plane 404. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, a MEC service, an IoT device, or another resource) using an encrypted session protocol, such as SSL. Network processor 406 is configured to monitor packets from the mobile device and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decryption engine 410 using various techniques as described herein. Otherwise, processing by SSL decryption engine 410 is omitted. Application identification (APP ID) module 412 is configured to determine what type of traffic the session involves (e.g., IP traffic and/or other network protocols of traffic, such as GTP-U traffic, between various monitored interfaces as similarly described above with respect to FIGS. 1A-1F) and to identify a user associated with the traffic flow (e.g., to identify a user-ID and an application-ID (APP-ID) as described herein). For example, APP ID 412 can recognize a GET request in the received data and conclude that the session requires an HTTP decoder 414. As another example, APP ID 412 can recognize GTP-U session messages carrying encapsulated IP traffic from UEs (e.g., over various interfaces, such as similarly described above with respect to FIGS. 1A-2B) and conclude that the session requires a GTP-U decoder (e.g., to extract information exchanged in the GTP-U traffic session over various interfaces including various parameters, such as similarly described above with respect to FIGS. 1A-2B). For each type of protocol, there exists a corresponding decoder 414. In one embodiment, the application identification is performed by an application identification module (e.g., APP ID component/engine), and a user identification is performed by another component/ engine. Based on the determination made by APP ID 412, the packets are sent to an appropriate decoder 414. Decoder 414 is configured to assemble packets (e.g., which may be received out of order) into the correct order, perform tokenization, and extract out information (e.g., such to extract various information exchanged in GTP-U traffic over various interfaces as similarly described above and further described below). Decoder 414 also performs signature matching to determine what should happen to the packet. SSL encryption engine 416 performs SSL encryption using various techniques as described herein and the packets are then forwarded using a forward component 418 as shown. As also shown, policies 420 are received and stored in the management plane 402. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-U/IP traffic and/or DPI of monitored GTP-U/IP and/or other protocol(s) traffic, such as S1-U/S11/N2/N3/ N4/other interfaces as similarly described above with respect to FIGS. 1A-2B) is applied as described herein with respect to various embodiments based on the monitored, decrypted, identified, and decoded session traffic flows.

As also shown in FIG. 4, an interface (I/F) communicator 422 is also provided for a security gateway manager/management communications. In some cases, network communications of other network elements on the service provider network are monitored using network device 400, and data plane 404 supports decoding of such communications (e.g., network device 400, including I/F communicator 422 and decoder 414, can be configured to monitor and/or communicate on, for example, reference point interfaces such as S1-U, S11, N2, N3, N4, and/or other interfaces where wired and wireless network traffic flow exists). As such, network device 400 including I/F communicator 422 can be used to implement the disclosed techniques for providing a quantum ready intelligent security gateway in mobile networks as described above and as will be further described below.

Additional example processes for the disclosed techniques for a quantum ready intelligent security gateway will now be described.

Example Processes for a Quantum Ready Intelligent Security Gateway

FIG. 5 is a flow diagram of a process for a quantum ready intelligent security gateway in accordance with some embodiments. In some embodiments, a process 500 as shown in FIG. 5 is performed by the security gateway and techniques as similarly described above including the embodiments described above with respect to FIGS. 1A-2B. In one embodiment, process 500 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 502, monitoring network traffic on a mobile network at a security gateway to identify a new session is performed. For example, the security gateway (e.g., a firewall, a network sensor acting on behalf of the firewall, or another device/component that can implement security policies) can monitor, in some cases, various protocols, such as GTP-U (e.g., over S1-U, S11, N3, N4, and/or other interfaces) and/or other protocols, on the mobile network and, more specifically, by performing the disclosed techniques can monitor various interfaces, such as the S1-U, S11, and N3, N4 interfaces, as similarly described above with respect to FIGS. 1A-2B. In an example implementation, the security gateway includes a quantum ready intelligent security gateway that supports quantum key distribution (QKD) and/or post-quantum cryptography (PQC) for providing a secure tunnel to the mobile network.

At 504, determining meta information associated with the new session by extracting the meta information from the network traffic at the security gateway via one or more interfaces is performed. For example, determining the meta information associated with the new session can be implemented by performing the disclosed techniques for a quantum ready intelligent security gateway as similarly described above with respect to FIGS. 1A-2B.

At 506, enforcing a security policy on the new session at the security gateway based on the meta information to apply context-based security in the mobile network is performed. For example, security policy enforcement can include allowing or blocking the session or performing another action based on a policy, such as similarly described above.

FIG. 6 is another flow diagram of a process for a quantum ready intelligent security gateway in accordance with some embodiments. In some embodiments, a process 600 as shown in FIG. 6 is performed by the security platform and techniques as similarly described above including the embodiments described above with respect to FIGS. 1A-4. In one embodiment, process 600 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, securing a tunnel for network communications to a mobile network is performed using a security gateway. In an example implementation, the security gateway includes a quantum ready intelligent security gateway that supports quantum key distribution (QKD) and/or post-quantum cryptography (PQC) for providing a secure tunnel to the mobile network (e.g., such as by implementing the NIST proposals for the following: FIPS 203, Module-Lattice-Based Key-Encapsulation Mechanism Standard (available at https://csrc.nist.gov/pubs/fips/203/ipd), FIPS 204, Module-Lattice-Based Digital Signature Standard (available at https://csrc.nist.gov/pubs/fips/204/ipd), and FIPS 205, Stateless Hash-Based Digital Signature Standard (available at https://csrc.nist.gov/pubs/fips/205/ipd)).

At 604, monitoring network traffic on a mobile network at the security gateway to identify a new session is performed. For example, the security gateway (e.g., a firewall, a network sensor acting on behalf of the firewall, or another device/component that can implement security policies) can monitor, in some cases, various protocols, such as GTP-U (e.g., over S1-U, S11, N3, N4, and/or other interfaces) and/or other protocols, on the mobile network and, more specifically, by performing the disclosed techniques can monitor various interfaces, such as the S1-U, S11, and N3, N4 interfaces, as similarly described above with respect to FIGS. 1A-2B.

At 606, determining meta information associated with the new session by extracting the meta information from the network traffic at the security gateway via one or more interfaces is performed. For example, determining the meta information associated with the new session can be implemented by performing the disclosed techniques for a quantum ready intelligent security gateway as similarly described above with respect to FIGS. 1A-2B.

At 608, enforcing a security policy on the new session at the security gateway based on the meta information to apply context-based security in the mobile network is performed. For example, security policy enforcement can include allowing or blocking the session or performing another action based on a policy, such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      monitor network traffic on a mobile network at a security gateway to identify a new session, wherein the network traffic includes video traffic and control and management traffic between a base station and a core network;
      inspect the control and management traffic for threats;
      offload the video traffic;
      inspect the control and management traffic for threats without inspecting the video traffic;
      determine meta information associated with the new session by extracting the meta information from the network traffic via one or more interfaces, wherein the meta information includes subscriber information, equipment information, and network slice information, wherein the subscriber-ID includes one or more of the following: a Global Line Identifier (GLI), or a Global Cable Identifier (GCI), and wherein the equipment-ID includes one or more of the following: International Mobile Equipment Identifier (IMEI) and/or Permanent Equipment Identifier (PEI), wherein the network slice-ID includes Single Network Slice Selection Assistance Information (S-NSSAI); and enforce a security policy on the new session at the security gateway based on the meta information to apply context-based security in the mobile network; and a memory coupled to the processor and configured to provide the processor with instructions.

2. The system recited in claim 1, wherein the security gateway includes a quantum ready intelligent security gateway that supports quantum key distribution (QKD) and/or post-quantum cryptography (PQC) for providing a secure tunnel to the mobile network.

3. The system recited in claim 1, wherein the security gateway includes a quantum ready intelligent security gateway that supports intelligent offloading of the monitored network traffic based on an offloading policy.

4. The system recited in claim 1, wherein the context-based security includes subscriber-ID based security.

5. The system recited in claim 1, wherein the context-based security includes equipment-ID based security.

6. The system recited in claim 1, wherein the context-based security includes network slice-ID based security.

7. The system recited in claim 1, wherein the security gateway is configured with a plurality of security policies to apply subscriber-ID based security, equipment-ID based security, and/or network slice-ID based security in the mobile network.

8. The system recited in claim 1, wherein the security gateway is configured with a plurality of security policies to apply vulnerability protection, intrusion prevention, antivirus, antispyware, DNS security, denial of service (DoS) protection, and/or cloud-based security.

9. The system recited in claim 1, wherein the processor is further configured to:
   perform level threat identification and prevention in the mobile network.

10. The system recited in claim 1, wherein the processor is further configured to:
   perform application identification and control in the mobile network.

11. The system recited in claim 1, wherein the processor is further configured to:
   perform URL filtering in the mobile network.

12. The system recited in claim 1, wherein the processor is further configured to:
   block the new session from accessing a resource based on the security policy.

13. The system recited in claim 1, wherein the processor is further configured to:
   allow the new session to access a resource based on the security policy.

14. A method, comprising:
   monitoring network traffic on a mobile network at a security gateway to identify a new session, wherein the network traffic includes video traffic and control and management traffic between a base station and a core network;
   inspecting the control and management traffic for threats;
   offloading the video traffic;

inspecting the control and management traffic for threats without inspecting the video traffic;

determining meta information associated with the new session by extracting the meta information from the network traffic via one or more interfaces, wherein the meta information includes subscriber information, equipment information, and network slice information, wherein the subscriber-ID includes one or more of the following: a Global Line Identifier (GLI), or a Global Cable Identifier (GCI), and wherein the equipment-ID includes one or more of the following: International Mobile Equipment Identifier (IMEI) and/or Permanent Equipment Identifier (PEI), wherein the network slice-ID includes Single Network Slice Selection Assistance Information (S-NSSAI); and enforcing a security policy on the new session at the security gateway based on the meta information to apply context-based security in the mobile network.

15. The method of claim 14, wherein the security gateway includes a quantum ready intelligent security gateway that supports quantum key distribution (QKD) and/or post-quantum cryptography (PQC) for providing a secure tunnel to the mobile network.

16. The method of claim 14, wherein the security gateway includes a quantum ready intelligent security gateway that supports intelligent offloading of the monitored network traffic based on an offloading policy.

17. The method of claim 14, wherein the security gateway is configured with a plurality of security policies to apply subscriber-ID based security, equipment-ID based security, and/or network slice-ID based security in the mobile network.

18. The method of claim 14, wherein the security gateway is configured with a plurality of security policies to apply vulnerability protection, intrusion prevention, antivirus, antispyware, DNS security, denial of service (DoS) protection, and/or cloud-based security.

19. A computer program product, the computer program product being embodied in a non-transitory computer readable storage medium and comprising computer instructions for:

monitoring network traffic on a mobile network at a security gateway to identify a new session, wherein the network traffic includes video traffic and control and management traffic between a base station and a core network;

inspecting the control and management traffic for threats;

offloading the video traffic;

inspecting the control and management traffic for threats without inspecting the video traffic;

determining meta information associated with the new session by extracting the meta information from the network traffic via one or more interfaces, the meta information includes subscriber information, equipment information, and network slice information, wherein the subscriber-ID includes one or more of the following: a Global Line Identifier (GLI), or a Global Cable Identifier (GCI), and wherein the equipment-ID includes one or more of the following: International Mobile Equipment Identifier (IMEI) and/or Permanent Equipment Identifier (PEI), wherein the network slice-ID includes Single Network Slice Selection Assistance Information (S-NSSAI); and enforcing a security policy on the new session at the security gateway based on the meta information to apply context-based security in the mobile network.

20. The computer program product recited in claim 19, wherein the security gateway includes a quantum ready intelligent security gateway that supports quantum key distribution (QKD) and/or post-quantum cryptography (PQC) for providing a secure tunnel to the mobile network.

\* \* \* \* \*